United States Patent

Hofer et al.

[11] 3,901,679
[45] Aug. 26, 1975

[54] 2-CHLOROETHANE-PHOSPHONIC-(OR THIONO PHOSPHONIC) ACID AMIDO COMPOUNDS AS PLANT GROWTH REGULANTS

[75] Inventors: Wolfgang Hofer, Wuppertal-Vohwinkel; Reinhard Schliebs, Cologne; Robert Rudolf Schmidt, Leverkusen-Rheindorf; Ludwig Eue, Cologne, all of Germany

[73] Assignee: Bayer Aktiengesellschaft, Leverkusen, Germany

[22] Filed: Sept. 29, 1970

[21] Appl. No.: 76,595

[30] Foreign Application Priority Data
Oct. 4, 1969 Germany.................... 1950100

[52] U.S. Cl. ............. 71/76; 71/71; 71/76; 71/77; 71/78; 71/86; 71/87
[51] Int. Cl. ............................................ A01n
[58] Field of Search .......... 71/86, 87, 77, 76, 78, 71/69, 71

[56] References Cited
UNITED STATES PATENTS

| | | | |
|---|---|---|---|
| 3,531,549 | 9/1970 | Randall............................ | 71/86 X |
| 3,551,528 | 12/1970 | Randall............................ | 71/86 X |
| 3,600,435 | 8/1971 | Randall et al.................... | 71/86 X |
| 3,679,780 | 7/1972 | Randall et al.................... | 71/86 |
| 3,733,192 | 5/1973 | Harris et al...................... | 71/86 |

FOREIGN PATENTS OR APPLICATIONS
803,947  1/1969  Canada.............................. 71/86

*Primary Examiner*—James O. Thomas, Jr.
*Attorney, Agent, or Firm*—Burgess, Dinklage & Sprung

[57] ABSTRACT

2-chloroethane-(thiono)-phosphonic acid amido compounds of the formula

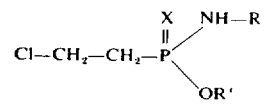

in which
 X is oxygen or sulfur;
 R is lower alkyl radical of from 1 to 6 carbon atoms or phenyl; and
 R' is hydrogen atom or a phenyl radical which may be substituted by nitro, halogen, alkyl or hydroxy; or
 R' can represent an agriculturally acceptable salt moiety, e.g., R' can be an alkali metal or equivalent, an alkaline earth metal or equivalent, an ammonium radical or equivalent,
are outstandingly effective as plant growth regulants to stimulate, inhibit or alter the growth of plants or parts thereof.

17 Claims, No Drawings

2-CHLOROETHANE-PHOSPHONIC-(OR THIONO PHOSPHONIC) ACID AMIDO COMPOUNDS AS PLANT GROWTH REGULANTS

The present invention relates to the use of certain 2-chloroethane-(thiono)-phosphonic acid amido compounds as agents for the regulation of plant growth.

It is known from Dutch Pat. Specification No. 6,802,633) that 2-chloroethanephosphonic acid exhibits plant-growth-regulating properties.

The present invention provides a method for the control of plant growth which comprises applying to the plant or seed thereof a 2-chloroethane-phosphonic acid amido or 2-chloroethane-thionophosphonic acid amido compound of the general formula

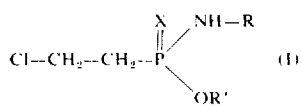 (I)

in which
X is oxygen or sulfur;
R is lower alkyl radical of from 1 to 6 carbon atoms or phenyl; and
R' is hydrogen atom or a phenyl radical which may be substituted by nitro, halogen, alkyl or hydroxy; or R' can represent an agriculturally acceptable salt moiety, e.g. R' can be an alkali metal or equivalent, an alkaline earth metal or equivalent, an ammonium radical or equivalent, either alone or in admixture with a solid or liquid diluent or carrier.

Some of the above compounds are known to have fungicidal effects. It was, however, very surprising that the compounds used in this invention have plant-growth-regulating properties. Unexpectedly, the 2-chloroethane(thino)-phosphonic acid amido compounds according to the invention show a considerably higher plant-growth-regulating activity than the 2-chloroethanephosphonic acid known from the prior art. This acid is chemically the closest active compound of the same type of activity. The substances according to the invention therefore represent a valuable enrichment of the art.

The substances to be used according to the invention are defined by the general formula (I), wherein
R is preferably lower alkyl radicals of from 1 to 4 carbon atoms or for a phenyl radical; and R' is preferably hydrogen or phenyl, which may be substituted with nitro, methyl, hydroxy or chlorine.

As examples of the active compounds which can be used according to the invention, there are mentioned in particular:

2-chloroethane-phosphonic acid mono-N-methylamide,
2-chloroethane-phosphonic acid mono-N-ethylamide,
2-chloroethane-phosphonic acid mono-N-n-propylamide,
2-chloroethane-phosphonic acid-mono-N-iso-propylamide,
2-chloroethane-phosphonic acid mono-N-n-butylamide,
2-chloroethane-phosphonic acid mono-N-sec.-butylamide,
2-chloroethane-phosphonic acid mono-N-tert.-butylamide,
2-chloroethane-phosphonic acid mono-N-iso-butylamide,
2-chloroethane-phsophonic acid mono-N-phenylamide,
2-chloroethane-thiono-phosphonic acid mono-N-methylamide,
2-chloroethane-thiono-phosphonic acid mono-N-ethylamide, 2-chloroethane-thiono-phosphonic acid mono-N-n-propylamide,
2-chloroethane-thiono-phosphonic acid mono-N-iso-propylamide,
2-chloroethane-thiono-phosphonic acid mono-N-n-butylamide,
2-chloroethane-thiono-phosphonic acid mono-N-sec.-butylamide,
2-chloroethane-thiono-phosphonic acid mono-N-tert.-butylamide,
2-chloroethane-thiono-phosphonic acid mono-N-iso-butylamide,
2-chloroethane-thiono-phosphonic acid mono-N-phenylamide, in addition, the sodium, potassium, ammonium, calcium and barium salts of these (thiono)-phosphonic acid amides; further, their:

2'-hydroxyphenyl esters, 3'-hydroxyphenyl esters,
4'-hydroxyphenyl esters, 2'-nitrophenyl esters,
3'-nitrophenyl esters, 4'-nitrophenyl esters,
2'-cresyl esters, 3'-cresyl esters, 4'-cresyl esters,
2'-chlorophenyl esters, 3'-chlorophenyl esters,
4'-chlorophenyl esters, 2',4'-dichlorophenyl esters and
2',6'-dichlorophenyl esters.

Some of the substances which can be used according to the invention are known, e.g. 2-chloroethane-thiono-phosphonic acid 2',4'-dichlorophenyl ester mono-N-isopropylamide [see Russian Patent Specification 197,359 and Z. Obsc. Chim. (Journal of General Chemistry of the U.S.S.R.) 38 (1968), No. 10, pp. 2260 – 2265].

Some of the substances used in the invention are new, but they can be prepared in simple manner according to known processes. They are obtained for example when 2-chloroethane-(thiono)-phosphonic acid amide chlorides are reacted with phenols in the presence of inert solvents, such as benzene, and acid-binding agents, for example triethylamine, at temperatures of 0° to 70°C. The reaction products may be isolated by filtering off the precipitated solids with suction, washing the organic phase with water, subsequently drying it over sodium sulphate and, finally, drawing off the solvent in a vacuum.

As examples of the 2-chloroethane-(thiono)-phosphonic acid amide chlorides which can be used for preparing compounds to be used in the invention, there are mentioned in particular:

2-chloroethane-phosphonic acid N-methylamide chloride,
2-chloroethane-phosphonic acid N-iso-propylamide chloride,
2-chloroethane-phosphonic acid anilide chloride,
2-chloroethane-thiono-phosphonic acid N-methylamide chloride,
2-chloroethane-thiono-phosphonic acid N-iso-propylamide chloride.

The 2-chloroethane-(thiono)-phosphonic acid amide chlorides used as starting materials are not all known but can readily be prepared by reacting 2-chloroethane-(thiono)-phosphonic acid dichloride with primary amines in the presence of an inert solvent, such as e.g. benzene, and an acid-binding agent, for example excess amine, at temperatures from −10° to 50°C. Working up may take place according to customary methods. Examples 1 to 24, below, illustrate the preparation of active compounds and their precursors.

The active compounds which can be used according to the invention interfere with the physiological phenomena of plant growth and can therefore be used as plant growth regulators.

The different effects of the active compounds depend essentially on the point in time of the application, with reference to the development stage of the seed or the plant, as well as on the concentrations applied.

Plant growth regulators are used for various purposes which are connected with the development stage of the plant. Thus, with plant growth regulators the seed dormancy can be broken in order to cause the seeds to germinate at a certain desired time at which the seed itself shows no readiness to germinate. The seed germination itself can by such active compounds, depending on the concentration applied, either be inhibited or promoted. This inhibition or promotion relates to the seedling development. The bud dormancy of the plants, that is to say the endogenic annual cycle, can be influenced by the active compounds so that, for example, the plants shoot or blossom at a point in time at which they normally show no readiness to shoot or blossom. The shoot or root growth can be promoted or inhibited by the active compounds in manner dependent on concentration. Thus, it is possible to inhibit very strongly the growth of the fully formed plant, or to bring the plant as a whole to a more robust habitus or to produce a dwarf growth.

Possible economic applications include the suppression of grass growth at roadsides and waysides, and the inhibition of the growth of lawns so that the frequency of grass-cutting (of lawn-mowing) can be reduced.

During the growth of the plant, the branching to the side can also be multiplied by a chemical breaking of the apical dominance. This is particularly useful in the case of propagation of plants by cuttings. In concentration-dependent manner, however, it is also possible to inhibit the growth of side-shoots, for example in order to prevent the formation of side-shoots in tobacco plants after decapitation and thus to promote the leaf growth.

In the case of the influencing of blossom formation, there can be achieved, in manner dependent on concentration and the point in time of the application, either a retarding or an acceleration of blossom formation. In certain circumstances, a multiplication of blossom initiation can also be obtained, these effects occurring when the appropriate treatments are carried out at the time of the normal blossom formation.

The influence of the active compounds on the foliage of the plants can be so regulated that defoliation is achieved, for example in order to facilitate the harvest or to reduce transpiration at a time at which the plants are to be transplanted.

Fruit initiation can be promoted so that more fruits or seedless fruits are formed (parthenocarpy). In certain conditions, the premature fall of fruit can also be prevented, or the fruit fall can be promoted up to a certain extent in the sense of a chemical thinning out. The property of promoting the fruit fall can also be exploited by effecting the treatment at the time of the harvest, whereby harvesting may be facilitated.

By spraying the unripe fruits with the compounds according to the invention, the ripening process can also be accelerated and a better colouring of the fruits can be achieved.

The active compounds to be used according to the present invention can be converted into the usual formulations, such as solutions, emulsions, suspensions, powders, pastes and granulates. These may be produced in known manner, for example by mixing the active compounds with extenders, that is, liquid or solid diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes or benzene, chlorinated aromatic hydrocarbons, such as chlorobenzenes, paraffins, such as mineral oil fractions, alcohols, such as methanol or butanol, or strongly polar solvents, such as dimethyl formamide or dimethyl sulphoxide, as well as water.

As solid diluents or carriers, there are preferably used ground natural minerals, such as kaolines, clays, talc or chalk, or ground synthetic minerals, such as highly-dispersed silicic acid or silicates.

Preferred examples of emulsifying agents include non-ionic and anionic emulsifiers, such as polyoxyethylene-fatty acid esters, polyoxyethylene-fatty alcohol ethers, for example alkylarylpolyglycol ethers, alkyl sulphonates and aryl sulphonates; and preferred examples of dispersing agents include lignin, sulphite waste liquors and methyl cellulose.

The formulations contain, in general, from 0.1 to 95, preferably 0.5 to 90, per cent by weight of active compound.

The active compounds may be applied as such or in the form of their formulations or of the application forms prepared therefrom, such as ready-to-use solutions, emulsifiable concentrates, emulsions, suspensions, spray powders, pastes, soluble powders, dusting agents and granulates. Application may take place in customary manner, for example by watering, squirting, spraying, scattering, dusting, etc.

The concentrations of active compound can be varied within a fairly wide range for actual application. In general, concentrations of 0.0005 to 2% by weight, preferably 0.01 to 0.5%, are used.

Further, there are applied, in general, 0.1 to 100 kg, preferably 1 to 10 kg, of active compound per hectare.

The growth regulators are desirably applied on a preferred time period, the precise delimitation of which is governed by the climatic and vegetative circumstances, as known to those skilled in the art.

The substances according to the invention possess also activity against plant-damaging bacteria.

In the following tests, carried out to demonstrate the bio-activity of the instant compounds, the following were chosen as representative test compounds:

COMPOUND 1

2-chloroethane-phosphonic acid phenyl ester-N-mono-isopropyl amide

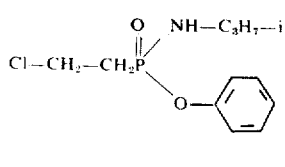

COMPOUND 2

2-chloroethane-phosphonic acid-2-hydroxy-phenyl ester-N-mono-isopropyl amide

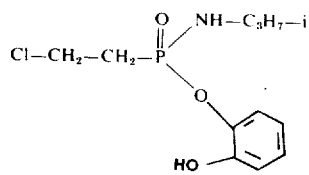

COMPOUND 3

2-chloroethane-phosphonic acid-mono-N-isopropyl amide

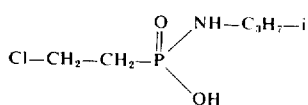

COMPOUND 4

2-chloroethane-thiono-phosphonic acid phenyl ester-N-mono-methyl amide

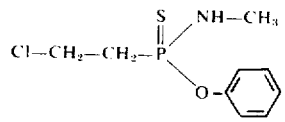

EXAMPLE A

Growth inhibition/linseed test

Solvent: 40 parts by weight acetone
Emulsifier: 0.25 part by weight alkylaryl polyglycol ether To produce a suitable preparation of active compound 1 part by weight of active compound was mixed with the stated amount of solvent which contained the stated amount of emulsifier, and the concentrate was diluted with a disodium hydrogen phosphate-potassium dihydrogen phosphate buffer solution (pH 6) to the desired concentration.

Two batches of 25 linseeds were each laid out on a filter paper in a Petri dish. 10 ml of the preparation of active compound were pipetted into each dish. Germination of the seeds took place in the dark at 25°C.

After 3 days, the length of the shoot and the roots was determined and the growth inhibition compared with the control plant is expressed as a percentage. 100% denotes the standstill of growth, and 0% denotes a growth corresponding to that of the untreated plant.

The active compounds, the concentrations of the active compounds in ppm (= mg/kg) and results can be seen from Table A.

Table A

| Active compound | Growth inhibition/linseed % inhibition with 250 ppm | |
|---|---|---|
| | root | shoot |
| water (control) | 0 | 0 |
| Cl—CH₂—CH₂—P(=O)(OH)(OH) (known) | 83 | 36 |
| Compound 1 - 2-chloroethane-phosphonic acid phenyl ester-N-mono-isopropyl amide | 82 | 96 |
| Compound 2 - 2-chloroethane-phosphonic acid-2-hydroxy-phenyl ester N-mono-isopropyl amide | 90 | 80 |

Table A-continued

| Active compound | Growth inhibition/linseed % inhibition with 250 ppm | |
|---|---|---|
| | root | shoot |
| Compound 3 - 2-chloroethane-phosphonic acid-mono-N-isopropyl amide $$Cl-CH_2-CH_2-P\begin{array}{c}O\\\|\end{array}\begin{array}{c}NH-C_3H_7-i\\\diagup\\\diagdown\\OH\end{array}$$ | 42 | 53 |

EXAMPLE B

Growth inhibition and defoliation/beans

Solvent: 40 parts by weight acetone
Emulsifier: 0.25 part by weight alkylaryl polyglycol ether To produce a suitable preparation of active compound, 1 part by weight of active compound was mixed with the stated amount of solvent which contained the stated amount of emulsifier, and the concentrate was diluted with a disodium hydrogen phosphate-potassium dihydrogen phosphate buffer solution (pH 6) to the desired concentration.

Beans (*Phaseolus vulgaris*) 10 cm high were sprayed with preparations which contained 5000 ppm of active compound. After 6 days, the average length and the number of leaves of 3 beans per experiment were evaluated.

The active compounds and results can be seen from Table B.

EXAMPLE C

Growth inhibition/wheat

Solvent: 40 parts by weight acetone
Emulsifier: 0.25 part by weight alkylaryl polyglycol ether To produce a suitable preparation of active compound, 1 part by weight of active compound was mixed with the stated amount of solvent which contained the stated amount of emulsifier, and the concentrate was diluted with a disodium hydrogen phosphate-potassium dihydrogen phosphate buffer solution (pH 6) to the desired concentration.

Wheat plants of a size of 4 cm were sprayed with a preparation which contains 5000 ppm of active compound. After 10 days, the average length of the wheat was evaluated.

The active compounds and results can be seen from Table C.

Table B

| Active compound | Growth inhibition and defoliation/beans | |
|---|---|---|
| | Length in cm | Number of leaves |
| water (control) | 17.0 | 6 |
| $$Cl-CH_2-CH_2-P\begin{array}{c}O\\\|\end{array}\begin{array}{c}OH\\\diagup\\\diagdown\\OH\end{array}$$ (known) | 11.0 | 4 |
| Compound 1 - 2-chloroethane-phosphonic acid phenyl ester-N-mono-isopropyl amide $$Cl-CH_2-CH_2-P\begin{array}{c}O\\\|\end{array}\begin{array}{c}NH-C_3H_7-i\\\diagup\\\diagdown\\O-\phantom{.}\end{array}$$ | 11.0 | 2 |
| Compound 3 - 2-chloroethane-phosphonic acid-mono-N-isopropyl amide $$Cl-CH_2-CH_2-P\begin{array}{c}O\\\|\end{array}\begin{array}{c}NH-C_3H_7-i\\\diagup\\\diagdown\\OH\end{array}$$ | 11.0 | 3 |
| Compound 4 - 2-chloroethane-thiono-phosphonic acid phenyl ester-N-mono-methyl amide $$Cl-CH_2-CH_2-P\begin{array}{c}S\\\|\end{array}\begin{array}{c}NH-CH_3\\\diagup\\\diagdown\\O-\phantom{.}\end{array}$$ | 11.0 | 4 |

Table C

| Active compound | Growth inhibition/wheat Length in cm |
|---|---|
| water (control) | 20.0 |
| Cl—CH₂—CH₂—P(=O)(OH)(OH) (known) Compound 4 - 2-chloroethane-thionophosphonic acid phenyl ester-N-monomethyl amide | 6.5 |
| Cl—CH₂—CH₂—P(=S)(NH—CH₃)(O—C₆H₅) | 6.0 |

EXAMPLE D

Growth inhibition/beans (watering test)

Solvent: 40 parts by weight acetone
Emulsifier: 0.25 part by weight alkylaryl polyglycol ether To produce a suitable preparation of active compound, 1 part by weight of active compound was mixed with the stated amount of solvent which contained the stated amount of emulsifier and the concentrate was diluted with a disodium hydrogen phosphate-potassium dihydrogen phosphate buffer solution (pH 6) to the desired concentration.

Three bean plants (of a height of 10 cm) in a pot (9 cm diameter) were watered once with a preparation of active compound corresponding to an applied amount of 10 kg/hectare. After 8 days, the length of the beans was determined.

The active compounds and results can be seen from Table D.

Table D

| Active compound | Growth inhibition/beans (watering test) Length in cm |
|---|---|
| water (control) | 25.0 |
| Cl—CH₂—CH₂—P(=O)(OH)(OH) (known) Compound 1 - 2-chloroethane-phosphonic acid phenyl ester-N-mono-isopropyl amide | 14.0 |
| Cl—CH₂—CH₂—P(=O)(NH—C₃H₇—i)(O—C₆H₅) Compound 3 - 2-chloroethane-phosphonic acid mono-N-isopropyl amide | 12.0 |
| Cl—CH₂—CH₂—P(=O)(NH—C₃H₇—i)(OH) | 11.5 |

EXAMPLE E

Growth inhibition/millet

Solvent: 40 parts by weight acetone
Emulsifier: 0.25 part by weight alkylaryl polyglycol ether To produce a suitable preparation of active compound, 1 part by weight of active compound was mixed with the stated amount of solvent which contained the stated amount of emulsifier, and the concentrate was diluted with a disodium hydrogen phosphate-potassium dihydrogen phosphate buffer solution (pH 6) to the desired concentration.

Millet plants (*Panicum miliaceum*) of a size of 4 cm were sprayed with a preparation which contained 2000 and 1000 ppm of active compound. After 6 days, the growth increase was evaluated.

The active compounds and results can be seen from Table E.

Table E

| Active compound | Growth inhibition/millet Concentration in ppm | Growth increase in cm |
|---|---|---|
| water (control) | 0 | 9.0 |
| Cl—CH₂—CH₂—P(=O)(OH)(OH) (known) Compound 3 - 2-chloroethane-phosphonic acid-mono-N-isopropyl amide | 2000 1000 | 2.0 5.0 |
| Cl—CH₂—CH₂—P(=O)(NH—C₃H₇—i)(OH) | 2000 1000 | 3.5 4.0 |

Table E-continued

| Active compound | Growth inhibition/millet Concentration in ppm | Growth increase in cm |
|---|---|---|
| Compound 2 - 2-chloroethane-phosphonic acid-2-hydroxy-phenyl ester-N-mono-isopropyl amide 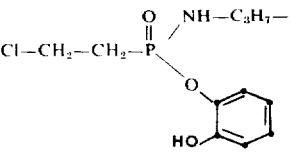 | 2000 | 2.0 |
|  | 1000 | 4.0 |

EXAMPLE F

Acceleration of fruit ripeness/tomato plants

Solvent: 40 parts by weight acetone
Emulsifier: 0.25 part by weight alkylaryl polyglycol ether To produce a suitable preparation of active compound, 1 part by weight of active compound was mixed with the stated amount of solvent which contained the stated amount of emulsifier and the concentrate was diluted with a disodium hydrogen phosphate-potassium dihydrogen phosphate buffer solution (pH 6) to the desired concentration.

Green, unripe fruits of tomato plants were sprayed once with a preparation which contained 5000 ppm of active compound. An accelerated ripening of the fruits was thereby achieved.

The active compounds and results can be seen from Table F.

Table F

| Active compound | Acceleration of fruit ripeness/Tomato plants Acceleration of ripeness in days |
|---|---|
| water (control) | 0 |
| $Cl-CH_2-CH_2-P(=O)(OH)(OH)$ (known) Compound 3 - 2-chloroethane phosphonic acid-mono-N-isopropyl amide | 12 |
| $Cl-CH_2-CH_2-P(=O)(NH-C_3H_7\text{-}i)(OH)$ | 14 |

Table F-continued

| Active compound | Acceleration of fruit ripeness/Tomato plants Acceleration of ripeness in days |
|---|---|
| Compound 2 - 2-chloroethane-phosphonic acid -2-hydroxy-phenyl ester-N-monoisopropyl amide 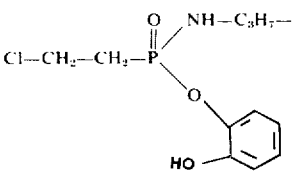 | 14 |

EXAMPLE G

Growth inhibition/Linseed

Solvent: 40 parts by weight acetone
Emulsifier: 0.25 parts by weight alkylaryl polyglycol ether To produce a suitable preparation of active compound, 1 part by weight of active compound is mixed with the stated amount of solvent which contains the stated amount of emulsifier, and the concentrate is diluted with a disodium hydrogen phosphatepotassium dihydrogen phosphate buffer solution (pH 6) to the desired concentration.

Two batches each of 25 linseed are each laid out on a filter paper in a Petri dish. 10 ml of the preparation of active compound are pipetted into each dish. Germination of the seeds takes place in the dark at 25°C.

After 3 days, the length of the shoot and the roots is determined and the growth inhibition compared with the control plant is expressed as a percentage. 100% denotes the standstill of growth, and 0% denotes a growth corresponding to that of the untreated plant.

The active compounds, the concentrations of the active compounds in pmm (mg/kg) and results can be seen from the following Table Table G

| Active compound | Growth inhibition/linseed % inhibition of the shoot with 50 ppm | 250 ppm |
|---|---|---|
| water (control) | 0 | 0 |
| $Cl-CH_2-CH_2-P(=O)(OH)(OH)$ (known) | 15 | 36 |
| $Cl-CH_2-CH_2-P(=S)(NH-C_3H_7\text{-}i)(O\text{-}C_6H_4\text{-}Cl)$ | 33 | 75 |

Table G-continued

| Active compound | Growth inhibition/linseed % inhibition of the shoot | |
|---|---|---|
| | with 50 ppm | 250 ppm |
| Cl—CH₂—CH₂—P(=S)(NH—C₃H₇—i)(O—C₆H₄—Cl) | 33 | 60 |
| Cl—CH₂—CH₂—P(=S)(NH—C₃H₇—n)(OH) | 50 | 64 |
| Cl—CH₂—CH₂—P(=O)(NH—C₃H₇—n)(OH) | 50 | 60 |

The preparation of the compounds to be used according to the invention, and of precursors therefore (Examples 1 and 2), is illustrated by the following Examples 1 to 24.

EXAMPLE 1

Preparation of 2-chloroethanethionophosphonic acid phenyl ester mono-N-methylamide

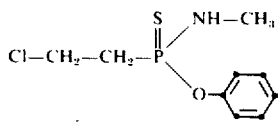

A solution of 19g (0.2 mole) phenol and 20 g (0.2 mole) triethylamine in 100 ml benzene is added dropwise at 50°C, with stirring, to 38.5 g (0.2 mole) 2-chloroethanethionophosphonic acid mono-N-methylamide chloride in 200 ml benzene. Stirring is subsequently continued for 2 hours. After suction filtration of the precipitated triethylamine hydrochloride, the benzene solution is washed with 300 ml H₂O, drying is effected over Na₂SO₄, and the solvent is removed in a vacuum. After "slight distillation" at 0.1 mm Hg and 60°C, a pale oil of the refractive index $n_D^{27} = 1.5706$ remains behind. The yield is 35 g (70%) of 2-chloroethanethionophosphonic acid phenyl ester mono-N-methylamide.

| Analysis: | S | N | Cl |
|---|---|---|---|
| Calc. for C₉H₁₂ClNOPS: | 12.80%; | 5.60%; | 14.20%; |
| Found: | 12.36%; | 5.62%; | 14.26%. |

The 2-chloroethanethionophosphonic acid mono-N-methylamide chloride required as starting product is prepared as follows:

15.5 g (0.5 mole) methylamine in 200 ml toluene are added to 49.5 g (0.25 mole) 2-chloroethanethionophosphonic acid dichloride in 500 ml toluene. Stirring is effected for one hour, the salts are then filtered off with suction; washing with water is effected, followed by drying over sodium sulphate, and the solvent is drawn off. After "slight distillation" at 0.1 mm Hg/80°C, a yellow oil remains behind. Yield: 41 g (85% of the theory); $n_D^{28} = 1.5613$.

EXAMPLE 2

Preparation of 2-chloroethanephosphonic acid mono-N-isopropylamide

Cl—CH₂—CH₂—P(=O)(NH—C₃H₇—i)(OH)

12 g (0.3 mole) NaOH in 20 ml water are added dropwise at 40°C, with stirring, to 61 g (0.3 mole) 2-chloroethanephosphonic acid mono-N-isopropylamide chloride in 500 ml acetone. Stirring is continued for a further 2 hours at room temperature, suction filtration from precipitated salt is effected and the solvent is subsequently drawn off. There remain behind 53 g (69%) of 2-chloroethanephosphonic acid mono-N-isopropylamide, hygroscopic crystals of m.p. 102 – 108°C. -

The 2-chloroethanephosphonic acid mono-N-isopropylamide chloride required as starting product is prepared as follows:

59 g (1 mole) i-propylamine are added at 0°C to 91 g (0.5 mole) 2-chloroethanephosphonic acid dichloride in 1.5 l of toluene. Stirring is then effected for one hour at room temperature. The salts are filtered off with suction, then washed with a little water, and the solvent is drawn off. After slight distillation at 0.01 mmHg/80°, a yellowish oil remains behind.
Yield: 93 g (91%) $n_D^{28} = 1.4854$.

EXAMPLE 3

Preparation of 2-chloroethanephosphonic acid phenyl ester mono-N-isopropylamide

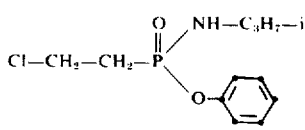

61 g (0.3 mole) 2-chloroethanephosphonic acid mono-N-isopropylamide chloride (cf Example 2) are added at 40°C to 28 g (0.3 mole) phenol, 46 g (0.33 mole) potassium carbonate and 500 ml acetonitrile. Stirring is then effected for 2 hours at 60°C, suction filtration from the solid is effected, the solvent is drawn off in a vacuum and the residue is taken up in methylene chloride. The organic phase is washed with water dried over sodium sulphate, and the solvent is drawn off. Slight distillation is effected at 0.1 mmHg and 80°C. 31 g (40%) of 2-chloroethanephosphonic acid phenyl ester mono-N-isopropylamide remain behind as pale oil, $n_D^{27}$ = 1.5144.

| Analysis: | P | Cl |
|---|---|---|
| Calc. for $C_{11}H_{17}ClNO_2P$: | 11.9%; | 13.60; |
| Found: | 12.5%; | 12.03%. |

EXAMPLE 4

Preparation of 2-chloroethanephosphonic acid 2'-hydroxyphenyl ester mono-N-isopropylamide

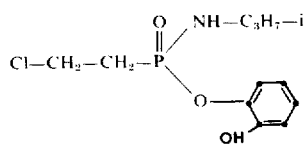

30 g (0.3 mole) triethylamine are added at room temperature to 500 ml benzene, 61 g (0.3 mole) 2-chlorethanephosphonic acid mono-N-isopropylamide chloride (cf. Example 2) and 33 g (0.3 mole) catechol. Stirring is then effected for 2 hours at room temperature; suction filtration from precipitated salts is effected, followed by washing with a little water (about 100 ml) and drying over sodium sulphate. The solvent is subsequently drawn off and, finally, slight distillation is effected at 0.01 mmHg and 60°C. A pale oil remains behind. Yield 48 g (58%) of 2-chloroethanephosphonic acid 2'-hydroxyphenyl ester mono-N-isopropylamide; $n_D^{27}$ = 1.5344.

| Analysis: | N | Cl |
|---|---|---|
| Calc. for $C_{11}H_{17}ClNO_3P$: | 5.03%; | 12.8%; |
| Found: | 5.22%; | 11.0% |

EXAMPLE 5

Preparation of 2-chloroethanethionophosphonic acid 4'-chlorophenyl ester N-monoisopropylamide

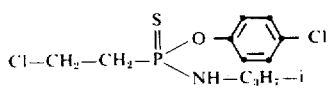

24 g (0.4 mole) isopropylamine are added to 58 g (0.2 mole) 2-chloroethanethionophosphonic acid 4'-chlorophenyl ester chloride in 300 ml benzene. Stirring is then effected for two hours at room temperature; the salts are subsequently filtered off with suction, followed by washing with water, and, after drying with sodium sulphate, the solvent is drawn off. The residue is slightly distilled. There remains behind a pale oil, $n_D^{24}$ = 1.5705, yield 54 g (86% of the theory) 2-chloroethanethionophosphonic acid 4'-chlorophenyl ester N-monoisopropylamide

| Analysis | Cl | N | S |
|---|---|---|---|
| Calc. for $C_{11}H_{16}Cl_2NOPS$: | 22.70%; | 4.50%; | 10.25%; |
| Found: | 23.15%; | 4.02%; | 10.27%. |

The starting product used is prepared as follows:

A solution of 65 g (0.5 mole) 4-chlorophenol and 20 g (0.5 mole) sodium hydroxide in 200 ml water is added to 99 g (0.5 mole) 2-chloroethanethionophosphonic acid dichloride. Stirring is then effected for one hour at room temperature, followed by taking up in methylene chloride and separation of the aqueous phase. After washing with water and drying with sodium sulphate, the solvent is drawn off and slight distillation is effected. Yield: 86 g (59% of the theory) 2-chloroethanethionophosphonic acid 4'-chlorophenyl ester chloride, $n_D^{23}$: 1.5856.

Analogously with Example 5, the following compounds are prepared:

EXAMPLE 6

Preparation of 2-chloroethane-thiono-phosphonic acid 4'-methyl-phenyl ester N-mono-isopropylamide

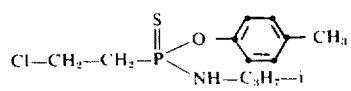

Yield: 76% of theory, $n_D^{24}$: 1.5542. The starting product 2-chloroethane-thiono-phosphonic acid 4'-methyl phenyl ester chloride is obtained analogously with Example 5 in a yield of 64%, $n_D^{24}$: 1.5686.

EXAMPLE 7

Preparation of 2-chloroethane-thiono-phosphonic acid 2'-chloro-phenyl ester N-mono-isopropylamide

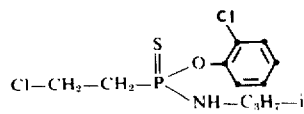

Yield: 66%, $n^{24}$:1.5687. Starting product: 2-chloroethane-thiono-phosphonic acid 2'-chlorophenyl ester chloride. Yield: 66%, $n_D^{24}$: 1.5862.

EXAMPLE 8

Preparation of 2-chloroethane-thiono-phosphonic acid 2', 6'-dichlorophenyl ester -N-mono-isopropylamide

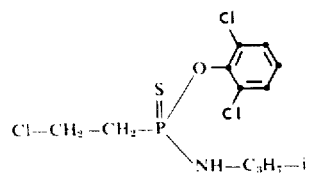

Yield: 53%, melting point 101°C. Starting product: 2-chloroethane-thiono-phosphonic acid 2',6'-dichloro-phenyl ester chloride, yield: 53%, $n_D^{24}$: 1.5944.

EXAMPLE 9

Preparation of 2-chloroethane-thiono-phosphonic acid 2',4'-dichloro-phenyl ester N-mono-isopropylamide

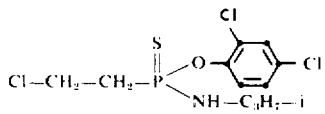

Yield: 73%, $n_D^{24}$: 1.5790. Starting product: 2-chloroethane-thiono-phosphonic acid 2',4'-dichloro-phenyl ester chloride, yield: 60%, $n_D^{20}$: 1.5962.

EXAMPLE 10

Preparation of 2-chloroethane-thiono-phosphonic acid 3'-chloro-phenyl ester N-mono-isopropylamide

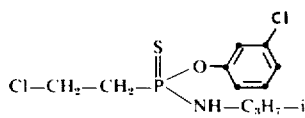

Yield: 84%, $n_D^{24}$: 1.5668. Starting product: 2-chloroethane-thiono-phosphonic acid 3'-chloro phenyl ester chloride, yield: 73%, $n_D^{24}$: 1.5851.

EXAMPLE 11

Preparation of 2-chloroethane-thiono-phosphonic acid 2',4'-dichloro-phenyl ester N-mono-methylamide

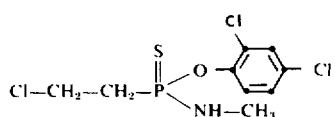

Yield: 66%, $n_D^{24}$: 1.5900. Starting product compare Example 9.

EXAMPLE 12

Preparation of 2-chloroethane-thiono-phosphonic acid 3'-chloro-phenyl ester N-mono-methylamide

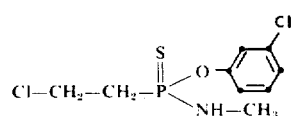

Yield: 79%, $n_D^{24}$: 1.5840. Starting product: compare Example 10.

EXAMPLE 13

Preparation of 2-chloroethane-thiono-phosphonic acid phenyl ester N-mono-ethylamide

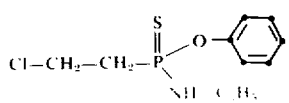

Yield: 81%, $n_D^{24}$: 1.5626. Starting product: 2-chloroethane-thiono-phosphonic acid phenyl ester chloride, yield: 77%, $n_D^{28}$: 1.5688.

EXAMPLE 14

Preparation of 2-chloroethane-thiono-phosphonic acid phenyl ester N-mono-isobutylamide

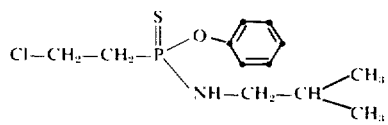

Yield: 87%, $n_D^{24}$: 1.5511. Starting product: compare Example 13.

EXAMPLE 15

Preparation of 2-chloroethane-thiono-phosphonic acid phenyl ester N-mono-phenylamide

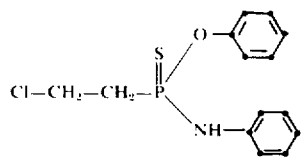

Yield: 55%, melting point: 60°–62°C. Starting product: compare Example 13.

EXAMPLE 16

Preparation of 2-chloroethanephosphonic acid phenyl ester N-mono-n-butylamide

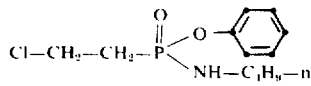

19 g (0.2 mole) phenol are added to 44 g (0.2 mole) 2-chloroethanephosphonic acid N-mono-n-butylamide chloride in 400 ml benzene. 21 g (0.2 mole) triethylamine are subsequently added dropwise at room temperature and stirring is effected for 1 hour. The salts are filtered off with suction; washing with water is effected, followed by drying with sodium sulphate, and the solvent is drawn off. After slight distillation, a pale oil remains behind, yield: 24 g (44% of the theory) 2-chloroethanephosphonic acid phenyl ester N-mono-n-butylamide, $n_D^{23}$: 1.5160.

| Analysis: | Cl | N |
|---|---|---|
| Calc. for $C_{12}H_{19}ClNO_2P$: | 12.90%; | 5.10%; |
| Found: | 12.16%; | 5.35%. |

The 2-chloroethanephosphonic acid N-mono-n-butylamide chloride used as starting product is prepared as follows:

73 g (1 mole) n-butylamine are added to 91 g (0.5 mole) 2-chloroethanephosphonic acid dichloride in 1500 ml toluene. Stirring is then effected for 2 hours at room temperature, the salts are filtered off with suction, and, after washing with water and drying with sodium sulphate, the solvent is drawn off. After slight distillation, a colourless oil remains behind, yield: 75 g (69% of the theory) 2-chloroethanephosphonic acid N-mono-n-butylamide chloride, $n_D^{23}$: 1.4962.

EXAMPLE 17

Preparation of 2-chloroethane-thiono-phosphonic acid phenyl ester N-mono-n-butylamide

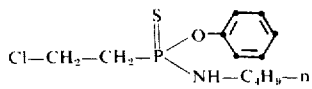

Yield: 70%, $n_D^{23}$: 1.5479. Starting product: 2-chloroethane-thiono-phosphonic acid N-mono-n-butylamide chloride from 2-chloroethane-thiono-phosphonic acid dichloride and n-butylamine, yield: 90%, $n_D^{23}$: 1.5363.

EXAMPLE 18

Preparation of 2-chloroethane-thiono-phosphonic phenyl ester N-mono-isopropylamide

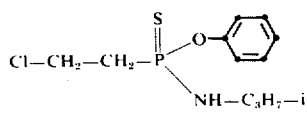

Yield: 43%, $n_D^{24}$: 1.5611. Starting product: 2-chloroethane-thiono-phosphonic acid N-mono-isopropylamide chloride, yield: 87%, $n_D^{26}$: 1.5476.

EXAMPLE 19

Preparation of 2-chloroethane-phosphonic acid 2'-hydroxy-phenyl ester N-mono-n-butylamide

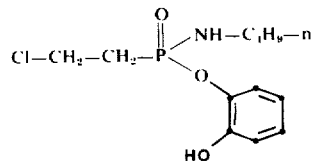

Yield: 35%, $n_D^{24}$: 1.5273. Starting product: compare Example 16.

EXAMPLE 20

Preparation of 2-chloroethane-phosphonic acid 4'-hydroxy-phenyl ester N-mono-n-butylamide

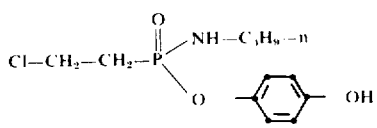

Yield: 32%, $n_D^{24}$: 1.5241. Starting product: compare Example 16.

EXAMPLE 21

Preparaton of 2-chloroethanethionophosponic acid N-monoisopropylamide

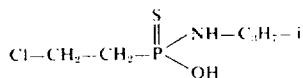

A solution of 5.5 g (0.3 mole) of water and 30 g (0.3 mole) triethylamine in 20 ml acetone is added at room temperature to 66 g (0.3 mole) 2-chloroethanethionophosphonic acid N-monoisopropylamide chloride in 100 ml benzene. Stirring is then effected for one hour, the precipitated salt is removed and the solvent is drawn off. After slight distillation, a pale oil remains behind. Yield: 54 g (89% of the theory) 2-chloroethanethiophosphonic acid N-monoisopropylamide, $n_D^{23}$: 1.5419.

| Analysis: | Cl | N |
|---|---|---|
| Calc. for $C_5H_{13}ClNOPS$: | 17.65%; | 6.95%; |
| Found: | 17.43%; | 6.49%. |

Starting product: compare Example 18.

Analogously with Example 21, the following compounds are prepared:

EXAMPLE 22

Preparation of 2-chloroethane-thiono-phosphonic acid-N-mono-phenylamide

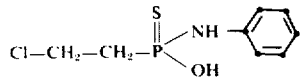

Yield: 92%, $n_D^{24}$: 1.5662. Starting product: 2-chloroethane-thiono-phosphonic acid N-mono-phenylamide chloride from 2-chloroethane-thiono-phosphonic acid dichloride and aniline, yield: 79%, $n_D^{23}$: 1.6145.

EXAMPLE 23

Preparation of 2-chloroethane-thiono-phosphonic acid-N-mono-n-butylamide

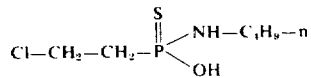

Yield: 93%, $n_D^{24}$: 1.5402. Starting product: cf. Example 17.

EXAMPLE 24

Preparation of 2-chloroethane-phosphonic acid N-mono-n-butylamide

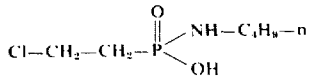

Yield: 61%, $n_D^{24}$: 1.4884. Starting product: compare Example 16.

The above Examples 17 to 23 are carried out in a manner analogous to that of Example 16.

It will be understood that the specification and examples are illustrative and are not to be construed as limitative of the invention.

What is claimed is:

1. Method for regulating plant growth which comprises applying to the plant a 2-chloroethanephosphonic acid amido or 2-chloroethanethionophosphonic acid amido compound of the general formula $$Cl-CH_2-CH_2-P\underset{O-R'}{\overset{X}{\underset{\|}{\diagup}}}NH-R$$

in which

X is oxygen or sulfur;

R is lower alkyl of from 1 to 6 carbon atoms or phenyl; and

R' is hydrogen or unsubstituted phenyl or phenyl substituted with nitro, halogen, alkyl or hydroxy; or a salt moiety.

2. Method for regulating plant growth which comprises applying a compound as defined in claim 1 in which R is an alkyl radical with 1 to 4 carbon atoms or a phenyl radical and R' is a hydrogen atom or a phenyl radical which may be substituted by nitro, methyl, hydroxy or chlorine, alone or in admixture with a solid or liquid diluent or carrier.

3. Method as claimed in claim 1 wherein R' is phenyl.

4. Method as claimed in claim 1 wherein said salt moiety is an alkali or alkaline earth metal or ammonium.

5. Method as claimed in claim 1 wherein said compound is applied in the form of a composition with a solid or liquid carrier, the composition containing from 0.0005 to 2% by weight of said compound.

6. Method as claimed in claim 5 wherein the composition contains from 0.01 to 0.5% by weight of compound.

7. Method as claimed in claim 1 wherein said compound is applied in amounts sufficient to promote the growth of plants.

8. Method as claimed in claim 1 wherein said compound is applied in amounts sufficient to hinder the growth of plants.

9. Method as claimed in claim 1 wherein said compound is applied in amounts sufficient to alter the growth of plants.

10. Method as claimed in claim 1 wherein said compound is applied at the rate of 0.1 to 10 kg per hectare.

11. Method as claimed in claim 10 wherein the rate is 1 to 10 kg per compound per hectare.

12. Method as claimed in claim 1 wherein said compound is designated as 2-chloroethane-phosphonic acid phenyl ester-N-mono-isopropyl amide.

13. Method as claimed in claim 1 wherein said compound is designated as 2-chloroethane-phosphonic acid-2-hydroxy-phenyl ester-N-mono-isopropyl amide.

14. Method as claimed in claim 1 wherein said compound is designated as 2-chloroethane-phosphonic acid-mono-N-isopropyl amide.

15. Method as claimed in claim 1 wherein said compound is designated as 2-chloroethane-thionophosphonic acid phenyl ester-N-mono-methyl amide.

16. Method for regulating plant growth which comprises applying to a plant seed a 2-chloroethane-phosphonic-acid-amido or 2-chloroethane-thionophosphonic acid amido compound, as defined in claim 1.

17. Method for regulating plant growth which comprises applying to a plant habitat a 2-chloroethane-phosphonic-acid-amido or 2-chloroethane-thionophosphonic acid amido compound, as defined in claim 1.

* * * * *